United States Patent [19]
Kinoshita et al.

[11] Patent Number: 4,912,579
[45] Date of Patent: Mar. 27, 1990

[54] CASSETTE HOLDER MECHANISM

[75] Inventors: Shigeo Kinoshita; Kimichika Yamada; Syouichiro Yokoi; Shigeru Tsuda, all of Tokyo, Japan

[73] Assignee: Clarion Co., Ltd., Tokyo, Japan

[21] Appl. No.: 210,035

[22] Filed: Jun. 22, 1988

[30] Foreign Application Priority Data

Jun. 29, 1987 [JP] Japan ............................ 62-098501[U]
Jun. 29, 1987 [JP] Japan ............................ 62-098503[U]
Jul. 23, 1987 [JP] Japan ............................ 62-111858[U]

[51] Int. Cl.⁴ ............................................. G11B 15/00
[52] U.S. Cl. ..................... 360/96.5; 360/966; 360/93
[58] Field of Search ....................... 360/96.5, 85, 96.6, 360/93

[56] References Cited
U.S. PATENT DOCUMENTS 4,620,246 10/1986 Kato ................................. 360/96.5
4,796,117 1/1989 Fleck ................................ 360/96.5
4,796,119 1/1989 Kakizaki et al. .................. 360/96.5

FOREIGN PATENT DOCUMENTS 61-96561 5/1986 Japan ................................ 360/96.5

Primary Examiner—John H. Wolff
Attorney, Agent, or Firm—Flynn, Thiel, Boutell & Tanis

[57] ABSTRACT

A cassette holder mechanism in a tape player includes an elongated hole formed in a cassette holder and engaging a pin extending from a guide arm so as to allow a limited relative movement of the cassette holder with respect to the guide arm, and includes a positioning spring for urging the cassette holder downwardly so that cassette in the cassette holder is reliably set at a predetermined position in a horizontal configuration.

9 Claims, 7 Drawing Sheets

CASSETTE HOLDER MECHANISM

FIELD OF THE INVENTION

This invention relates to a cassette holder mechanism for use in a tape player.

BACKGROUND OF THE INVENTION

Tape players in general have a cassette holder for holding a cassette to load it in a lower operating position or to eject it to an upper insertion position. The cassette holder is configured to move up and down in response to vertical movements of guide arms pivotably supported by side places of the player. The guide arm are moved by driving one of them by a cam which engages an engaging portion provided on a side surface of the guide arm. A cassette has two engaging holes in the bottom plate thereof. When the cassette is lowered to the operating position, the engaging holes thereof engage positioning pins provided in rear positions on a tape player chassis, and a front bottom surface of the cassette is supported by two front positioning pins on the tape player chassis, so that the cassette is positioned vertically and horizontally.

In the aforegoing cassette holder mechanism, since only one of the guide arms is driven by the cam and since some dimensional and mounting errors in related parts are inevitable, the cassette holder 5 often inclines in the right and left direction when brought to the lower operating position as shown in FIG. 6. In this case, the cassette 8 in the cassette holder 5 also inclines, and the engaging hole 81 and the front bottom surface of the cassette 8 at the floating side (the left side in the illustration) thereof fail to engage the rear positioning pin 10 and the front positioning pin 11 of the tape player chassis 9. Therefore, the cassette 8 is not positioned reliably. In FIG. 6, reference numeral 1 designates the side plate, and 2 denotes the guide arm.

OBJECT OF THE INVENTION

It is therefore an object of the invention to provide an excellent cassette holder mechanism capable of reliably fixing a cassette in position by lowering it to the operating position in a horizontal configuration.

SUMMARY OF THE INVENTION

An inventive cassette holder mechanism is characterized in that a vertically elongated hole provided in one of a guide arm and a cassette holder to receive a pivotal shaft extending from the other, an that a positioning pin is provided to urge the cassette holder or a cassette itself downwardly in a lowered position of the cassette holder.

Under the arrangement described above, a relative vertical play between the guide arm and the cassette holder and the urging force of the positioning spring permit the right or left end of the cassette holder to move downwardly with respect to the guide arm so as to absorb right-and-left inclinations of the cassette holder and the cassette. Therefore, engaging holes of the cassette never fail to engage the positioning pins and reliably position the cassette.

DETAILED DESCRIPTION

Figure 6:
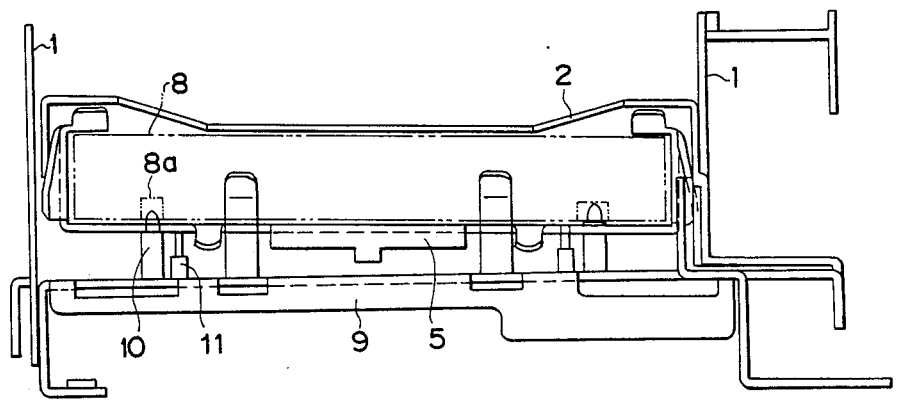
FIG. 6 shows a prior art cassette holder mechanism in which a cassette holder inclines.
Figure 7:
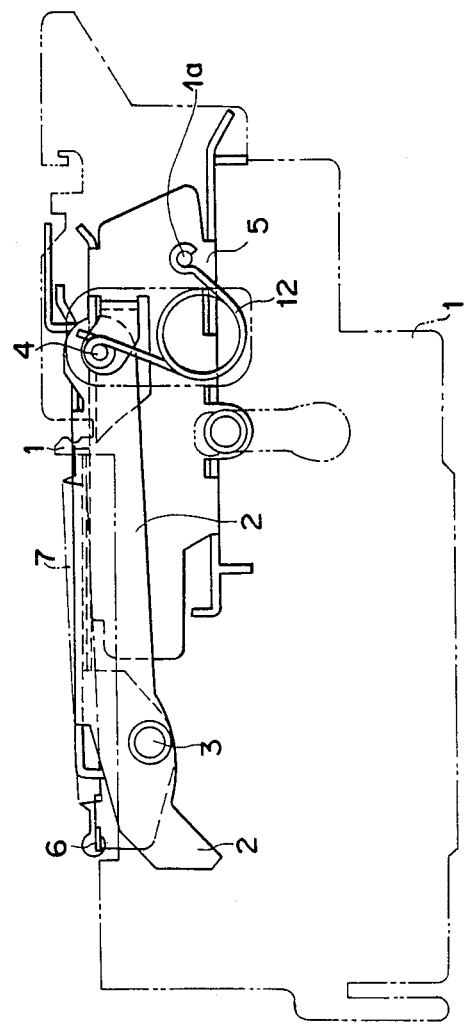
FIGS. 7 and 8 are side elevations of a further embodiment of the invention including a cassette holder held in an elevated position in FIG. 7 and in a lowered position in FIG. 8.
Figure 8:
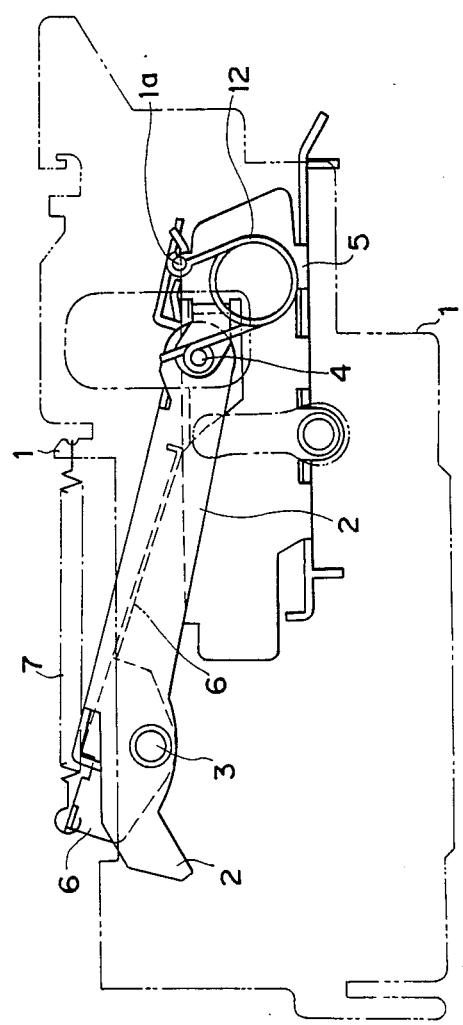

The invention is described below in detail, referring to preferred embodiments illustrated in the drawings. Reference numerals used in the illustrating of the prior art mechanism of FIG. 6 are also used in the other drawings as far as the same parts or members are referred to.

Figure 1:
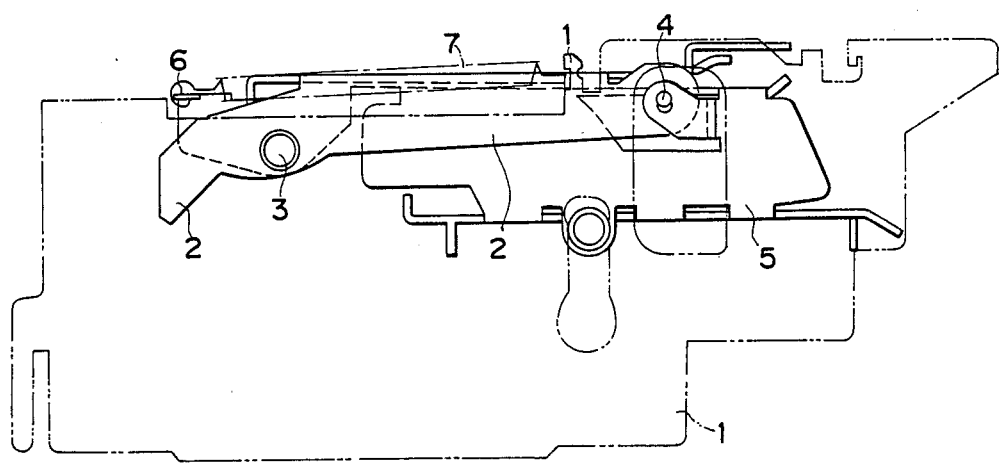
FIGS. 1 and 2 are side elevations of a cassette holder mechanism embodying the invention including a cassette holder in a lowered position in FIG. 1 and in an elevated position in FIG. 2.

In FIG. 1, a rear end portion of a guide arm 2 is mounted on a rear upper end portion of a side plate 1 by a pivot 3 for vertical pivotal movement. A front end portion of the guide arm 2 and a front upper end portion of the cassette holder 5 are conjoined by a pivot 4 to support the cassette holder 5 for vertical pivotal movement with respect to the guide arm 2. The pivot 4 extends from the guide arm 2 and engages a vertically elongated hole 5a provided in the cassette holder 5. The engagement between the pivot 4 and the elongated hole 5 provides the cassette holder 5 with a play of length l with respect to the guide arm 2.

At a rear portion inside the guide arm 2 is provided a positioning pivotal member 6 which is supported by the pivot 3 for vertical pivotal movement independently of the guide arm 2. The positioning pivotal member 6 is biased by a positioning spring 7 mounted between itself and the side plate 1 to normally urge the upper surface of the cassette holder 5 downwardly.

The aforegoing arrangements are provided on right and left side plates in substantially symmetrical configuration..

The aforegoing embodiment operates as follows.

Figure 2:
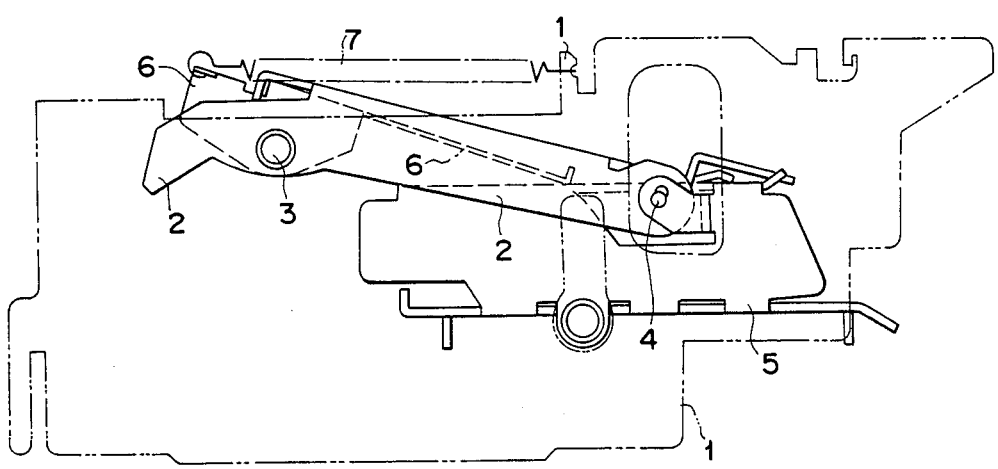
Figure 3:
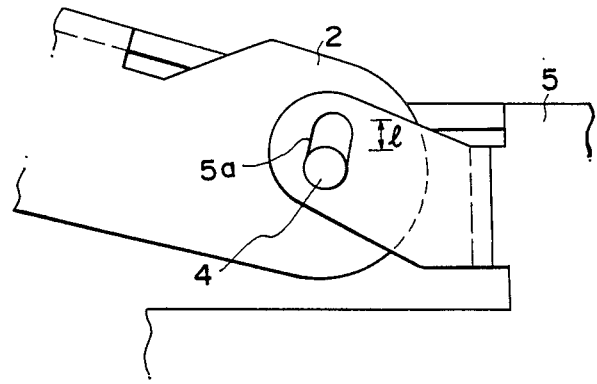
FIG. 3 and 4 are fragmentary enlarged side elevations of a guide arm and the cassette holder at junction therebetween in the same embodiment in which, however, the cassette holder floats above in FIG. 3 and is urged downwardly in FIG. 4.
Figure 4:
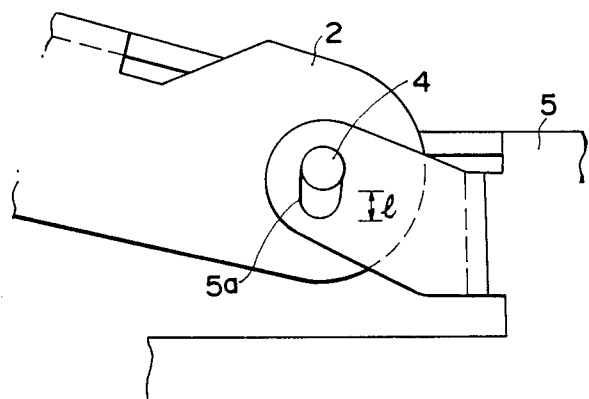

When the guide arm 2 is pivoted from the elevated position of FIG. 1 to a lowered position, the cassette holder 5 moves to a lowered position of FIG. 2. In this case, if this downward movement is effected by a camming operation alone, the guide arm 2 inclines to the right or left as shown in FIG. 6 due to dimensional and mounting errors of related members or parts, and the cassette holder 5 supported by the guide arm 2 and the cassette 8 in the cassette holder 5 are often set in an inclined configuration.

Figure 5:
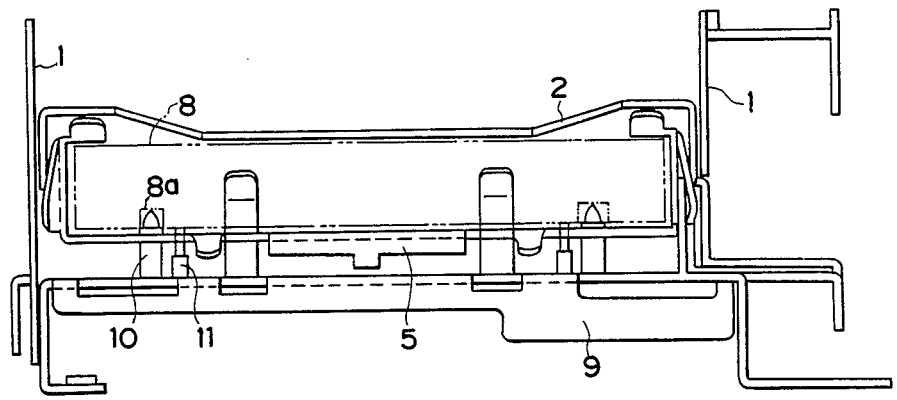
FIG. 5 is a front elevation of the same embodiment.

In contrast, in the inventive embodiment, the guide arm 2 and the cassette holder 5 are conjoined by engagement between the vertically elongated hole 5a of the cassette holder 5 and the pivot secured to the guide arm 2. Therefore, the cassette holder 5 can move vertically with respect to the guide arm 2 within the play length l of the elongated hole 5a. Further, the cassette holder 5 is urged downwardly by the energy of the positioning spring 7 applied to the upper surface thereof via the positioning pivotal member 6. That is, also in a case where the right or left end of the cassette holder 5 floats above due to the single-handed cam-drive of he guide arm 2, the floating amount is absorbed by the vertical play length l of the cassette holder 5 with respect to the guide arm 2 and the downward urging force of the positioning spring 7. Therefore, the aforegoing embodiment never fails to position the cassette holder 5 and the cassette 8 in properly horizontal configurations as shown in FIG. 5. As a result, the rear engaging holes 8a in the bottom of the cassette 8 in the cassette holder 5 reliably engage the rear portioning pins 10 of the tape player chassis 9, and the front bottom of the cassette 8 is reliably supported by the front positioning pins 11 of the tape player chassis 9, so that the cassette 8 is reliably positioned immovably in the vertical and horizontal directions.

The elongated hole for engagement between the guide arm and the cassette holder may be formed in the guide arm instead of the cassette holder. Further, the positioning spring may be located and arranged otherwise, for example, so as to urge the cassette itself instead of the cassette holder.

FIGS. 7 through 10 show a further embodiment of the invention configured to prevent rattle noises at the guide arms. In these drawings, the same reference numerals as those of FIGS. 1 through 5 denotes the same or equivalent members, and reference numeral 12 denotes a torsion spring used as an inversion spring to at on the guide arm.

Figure 9:
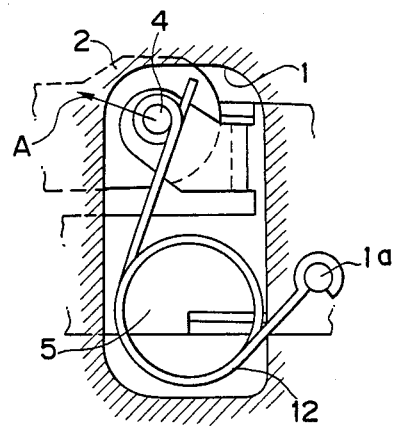
FIGS. 9 and 10 are fragmentary enlarged side elevations showing mounting arrangements of a torsion spring in the same embodiment in which the cassette holder is in the elevated position in FIG. 9 and in the lowered position in FIG. 10.
Figure 10:
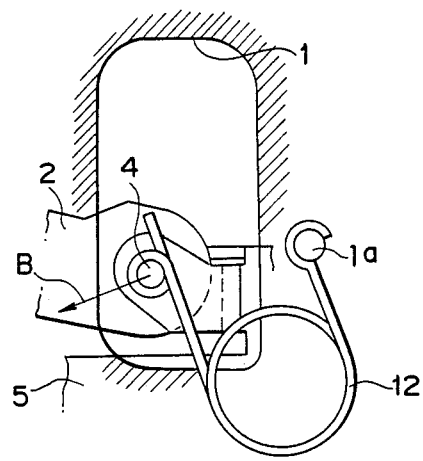

As shown in FIGS. 9 and 10, the side plate 1 is provided with a spring connection pin 1a which pivotally supports one end of a torsion spring 12. The other end of the torsion spring 12 is mounted pivotably on the pivot 4 which conjoins the guide arm 2 and the cassette holder 5. The vertical position of the spring connection pin 1a is an intermediate position of the overall vertical movement stroke of the pivot 4. When the guide arm 2 is in an elevated position, the torsion spring 12 biases the pivot 4 upwardly as shown by arrow A in the drawing. When the guide arm 2 is in a lowered position, the torsion spring 12 biases the pivot 5 downwardly as shown by arrow B in the drawing.

When a play is provided between the guide arm 2 and the cassette holder as described above, the guide arm 2 is movable to the extent of the play. As a result, the guide arm 2 often hits adjacent members upon shocks or vibrations and produces rattle noises. However, since the aforegoing embodiment includes the torsion spring 12 between the side late 1 and the pivot 4 of the guide arm 2, the guide arm 2 is held immovable in the elevated and lowered positions, and no rattle noise occurs. More specifically, when the guide arm 2 is in the elevated position, the torsion spring 12 produces an upward force as shown by arrow A in FIG. 5 so as to prevent downward movements of the guide arm 2. When the guide arm 2 is in the lowered position, the torsion spring 12 produces a downward force as shown by arrow B in FIG. 5 so as to prevent upward movements of the guide arm 2.

The inversion spring need not be a torsion spring and may be a coil spring.

The aforegoing mechanism may be modified to use a coil spring as the inversion spring in lieu of the torsion spring. Further, the inversion spring may be configured to act on the guide arm at a portion other than the pivot conjoining the guide arm and the cassette holder.

Figure 11:
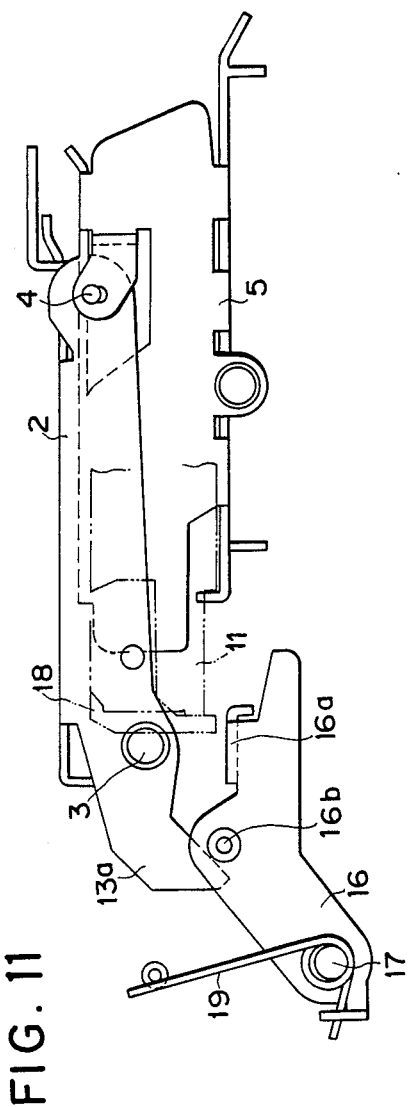
FIGS. 11 and 12 a left side elevations of a still further embodiment of the invention including a lid opening mechanism in which the cassette holder is in a cassette insertion position in FIG. 11 and in an operating position in FIG. 12.
Figure 12:
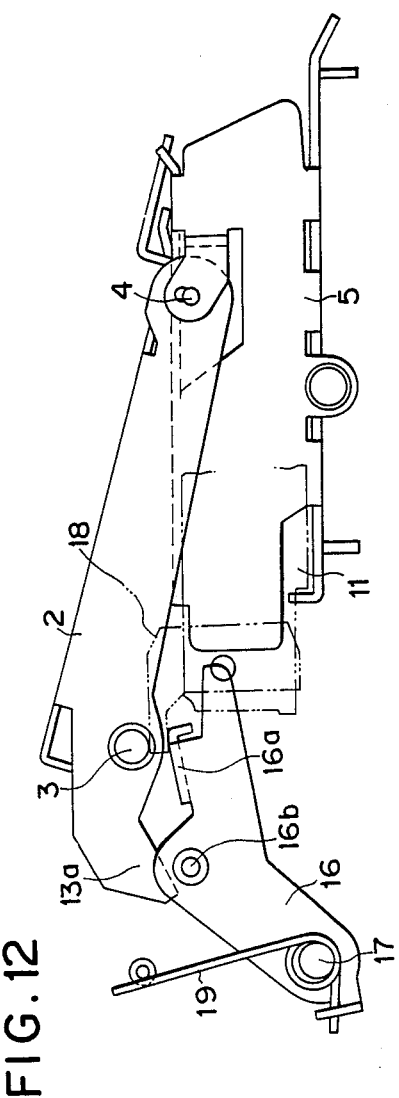

FIGS. 11 and 12 are side elevations showing the left-hand arrangement alone of a still further embodiment of the invention including a lid opening mechanism suitable for a digital audio tape player (DAT) using a cassette tape having a lid.

In FIG. 11 and 12, a front upper end of the cassette holder 5 holding a cassette 11 and a front end of the guide arm 2 are conjoined pivotably by the pivot 4. The guide arm 2 is mounted pivotably by the pivot 3 on the stationary side plate so a to be pivoted vertically by a driving force of a motor (not shown) to move the cassette holder 5 up and down. Behind the cassette holder 5 is provided a lid opening member 16 which is mounted to the stationary side plate by a pivot 7 pivotably up and down.

The lid opening member 16 has a lid opening portion 16a engageable with a lid 18 of the cassette 11 to open it and a regulated portion 16b regulated by the guide arm 2. When the guide arm 2 is in the upper insertion position shown in FIG. 11, the regulated portion 16b is regulated by the regulating portion 13a at a rear end of the guide arm 2 so that the lid opening member 16 is held at a lower position. When the regulating portion 13a moves upwardly due to a lowering motion of the guide arm 2, the lid opening member 16 is released from the regulation, and rotates in an opening direction under a biasing force of a torsion spring 19 to open the lid 18.

The right side of the mechanism, although not illustrated, have the same arrangement.

The aforegoing embodiment operates as follows.

First referring to FIG. 11, the cassette 11 is inserted while the guide arm 2 is in the upper insertion position. When the cassette insertion is detected, the guide arm 2 is driven by the motor and begins to move down. Responsively, the regulating portion 13a is elevated, and releases the lid opening member 16 so as to permit it to rotate in the opening direction from the position of FIG. 11 under the energy of the torsion spring 19. As a result, the lid opening portion 16a of the lid opening member 16 engages the lid 18 and finally opens it as shown in FIG. 2.

As described, since the embodiment can open the lid 18 by rotating the lid opening member 16 upwardly in response to the lowering motion of the guide arm 2, the cassette holder 5 need not move a large distance in the vertical direction as compared to the prior art arrangement using a stationary lid opening member 16. Further, since the movable lid opening member 16 is driven by the torsion spring 19 and the originally used guide arm 2 alone, the embodiment arrangement contributes to scale reduction and simplification of the apparatus.

Additionally, since the lid opening member 16 is provided at each side of the cassette holder 5, the lid 18 receives a balanced opening force, a twisting moment is not produced in the lid 18 as compared to an arrangement using the lid opening member 16 at only one side. In this respect, if the right and left lid opening members 16 are driven individually, a possible difference between both driving motions may produce twisting moment in the lid 18. In the aforegoing embodiment, however, since both lid opening members 16 are driven by guide arms 2 formed in a unitary body, no difference occurs between motions of both lid opening members 16. Therefore, the lid 18 is never deformed.

The aforegoing embodiment may be modified in some points. For example, both lid opening members may be driven directly by the guide arm or via another member, instead of using the spring energy.

As described above, according to the invention, by using a simple arrangement providing a vertical play between the guide arm and the cassette and urging the cassette holder or a cassette therein downwardly, the cassette is lowered in a horizontal configuration to the operating position, and the cassette is reliably positioned.

What is claimed is:

1. A cassette holder mechanism comprising:
   two guide arms and means supporting said guide arms between right and left side plates for pivotal movement about an arm pivot axis, said guide arms each having a portion which is spaced radially from said arm pivot axis and moves approximately vertically in response to pivotal movement of said guide arms;
   a cassette holder and support means supporting said cassette holder on said portions of said guide arms for limited vertical movement relative to said guide arms and for pivotal movement relative to said guide arms about an axis approximately parallel to said arm pivot axis, said cassette holder being movable approximately vertically between elevated and lowered positions through pivotal movement of said guide arms; and
   positioning spring means for urging said cassette holder or a cassette in the cassette holder downwardly when said cassette holder is in said lowered position;
   wherein said support means includes two vertically elongated holes which are each provided in one of said portion of a respective said guide arm and a respective portion of said cassette holder, and includes two pins which each project from the other of said portion of a respective said guide arm and the respective portion of said cassette holder, each said pin engaging a respective said elongated hole.

2. A cassette holder mechanism according to claim 1, wherein said positioning spring means includes a positioning member supported for pivotal movement about a positioning member pivot axis and having a first end which is spaced radially from said positioning member pivot axis, which moves approximately vertically in response to pivotal movement of said positioning member, and which is engageable with said cassette holder or a cassette in the cassette holder, and including a positioning spring having one end coupled to said positioning member and its other end coupled to one of side plates, said positioning spring yieldably urging pivotal movement of said positioning member in a direction causing said first end thereof to move downwardly.

3. A cassette holder mechanism according to claim 2, wherein said positioning member pivot axis is coaxial with said arm pivot axis of said guide arms, and wherein said spring is a helical coil spring.

4. A cassette holder mechanism comprising:
   two guide arms and means supporting said guide arms between right and left side plates for pivotal movement about an arm pivot axis, said guide arms each having a portion which is spaced radially from said arm pivot axis and which moves approximately vertically in response to pivotal movement of said guide arms;
   a cassette holder and support means supporting said cassette holder on said portions of said guide arms for limited vertical movement relative to said guide arms and for pivotal movement relative to said guide arms about an axis approximately parallel to said arm pivot axis, said cassette holder being movable approximately vertically between elevated and lowered positions through pivotal movement of said guide arms; and
   positioning spring means for urging said cassette holder or a cassette in the cassette holder downwardly when said cassette holder is in said lowered position;
   wherein said support means includes two vertically elongated holes which are each provided in one of said portion of a respective said guide arm and a respective portion of said cassette holder, and includes two pins which each project from the other of said portion of a respective said guide arm and the respective portion of said cassette holder, each said pin engaging a respective said elongated hole; and
   including an inversion spring biasing one of said guide arms upwardly when it is a position corresponding to said elevated position of said cassette holder and biasing it downwardly when it is in a position corresponding to said lowered position of said cassette holder.

5. A cassette holder mechanism according to claim 4, wherein each said elongated hole is formed in said cassette holder, and each said pin extends from a respective said guide arm, said inversion spring being in engagement with a respective said pin.

6. A cassette holder mechanism according to claim 5, wherein said inversion spring is a torsion spring.

7. A cassette holder mechanism according to claim 4, wherein said inversion spring is a torsion spring having a first leg supported on one of said pins and a second leg supported on one of said side plates.

8. A cassette holder mechanism comprising:
   two guide arms and means supporting said guide arms between right and left side plates for pivotal movement about an arm pivot axis, said guide arms each having a portion which is spaced radially from said arm pivot axis and which moves approximately vertically in response to pivotal movement of said guide arms;
   a cassette holder and support means supporting said cassette holder on said portions of said guide arms for limited vertical movement relative to said guide arms and for pivotal movement relative to said guide means about an axis approximately parallel to said arm pivot axis, said cassette holder being movable approximately vertically between elevated and lowered positions through pivotal movement of said guide arms; and
   positioning spring means for urging said cassette holder or a cassette in the cassette holder downwardly when said cassette holder is in said lowered position;
   wherein said support means includes two vertically elongated holes which are each provided in one of said portion of a respective said guide arm and a respective portion of said cassette holder, and includes two pins which each project from the other of said portion of a respective said guide arm and the respective portion said cassette holder, each said pin engaging a respective said elongated hole; and including two lid opening members which are each pivotably supported in the region of a respective side of said cassette holder, and means for effecting pivotal movement of said lid opening members in response to pivotal movement of said guide arms, each said lid opening member having a portion which pivots upwardly in response to pivotal movement of said lid opening members caused by pivotal movement of said guide arms in a direction moving said cassette holder downwardly and which opens a lid of a cassette held in said cassette holder.

9. A cassette holder mechanism according to claim 8, wherein said means for effecting movement of said lid opening members includes two biasing springs which each bias a respective said lid opening member in a direction corresponding to movement of said portion thereof upwardly, and includes each said guide arm engaging a respective said lid opening member and pivoting it in a direction against the urging of the associated biasing spring as said guide arms pivot in a manner effecting movement of said cassette holder to said elevated position.

* * * * *

UNITED STATES PATENT AND TRADEMARK OFFICE
CERTIFICATE OF CORRECTION

PATENT NO. : 4 912 579
DATED : March 27, 1990
INVENTOR(S) : Shigeo KINOSHITA et al It is certified that error appears in the above-identified patent and that said Letters Patent is hereby corrected as shown below:

Column 5, line 55; after "of" insert ---said---.
Column 6, line 54; change "means" to ---arms---.

Signed and Sealed this

First Day of October, 1991

*Attest:*

HARRY F. MANBECK. JR.

*Attesting Officer*     *Commissioner of Patents and Trademarks*